United States Patent [19]

Antekeier

[11] Patent Number: 5,269,547
[45] Date of Patent: Dec. 14, 1993

[54] SPRAY SUPPRESSANT APPARATUS

[75] Inventor: Steven A. Antekeier, North Shores, Mich.

[73] Assignee: Fleet Engineers, Inc., Muskegon, Mich.

[21] Appl. No.: 861,452

[22] Filed: Apr. 1, 1992

[51] Int. Cl.$^5$ ............................................. B62B 9/16
[52] U.S. Cl. .................... 280/154; 248/229; 248/231.8; 280/849; 280/851
[58] Field of Search .............. 248/231.8, 345.1, 229; 293/127, 128; 280/770, 851, 154, 849, 848

[56] References Cited

U.S. PATENT DOCUMENTS

| | | |
|---|---|---|
| 1,933,982 | 11/1933 | Jackson . |
| 2,330,684 | 9/1943 | Colling ............................ 293/127 X |
| 3,228,640 | 1/1966 | Wolsh ............................. 248/229 X |
| 3,358,725 | 12/1967 | Bussard et al. ................ 248/345.1 X |
| 3,368,826 | 2/1968 | Whitesell . |
| 3,384,388 | 5/1968 | Kobrehel et al. . |
| 3,494,075 | 2/1970 | Kunevicius ..................... 293/128 X |
| 3,899,192 | 8/1975 | Reddaway . |
| 4,138,129 | 2/1979 | Morris . |
| 4,215,873 | 8/1980 | Price . |
| 4,269,435 | 5/1981 | Jarvenkyla et al. ................ 280/814 |
| 4,298,640 | 11/1981 | Katoh ............................ 293/128 X |
| 4,325,563 | 4/1982 | Brandon et al. . |
| 4,503,780 | 3/1985 | Apissomian .................... 248/345.1 X |
| 4,706,981 | 11/1987 | Dorwart . |
| 4,921,276 | 5/1990 | Morin . |

OTHER PUBLICATIONS

Schlegel Corporation 20/20 Spray Suppressant Price and Installation Guide 1985.
Fleet Engineers Fiberglass Tandem Fenders Bulletin 302-27 (undated).
Fleet Engineers Spray Suppression Skirting Flyer 303-33 (undated).

Primary Examiner—Margaret A. Focarino
Assistant Examiner—Michael Mar
Attorney, Agent, or Firm—Varnum, Riddering, Schmidt & Howlett

[57] ABSTRACT

A spray suppressant brush apparatus is mounted to a vehicle fender adjacent to the ground-engaging tires. The apparatus comprises a dual channel mounting member. The first channel is preferably U-shaped and slidably receives the base of a spray suppressant brush. The second channel is preferably C-shaped and slidably receives a rolled outboard edge of the vehicle fender. The C-shaped channel has a first arm and a second, thickened arm which substantially surrounds the rolled edge of the vehicle fender. The thickened arm has a lever flange which extends along the top edge of the fender a short distance. Outward force exerted on the spray suppressant brush is resisted by the thickened arm and the lever flange thereof.

11 Claims, 2 Drawing Sheets

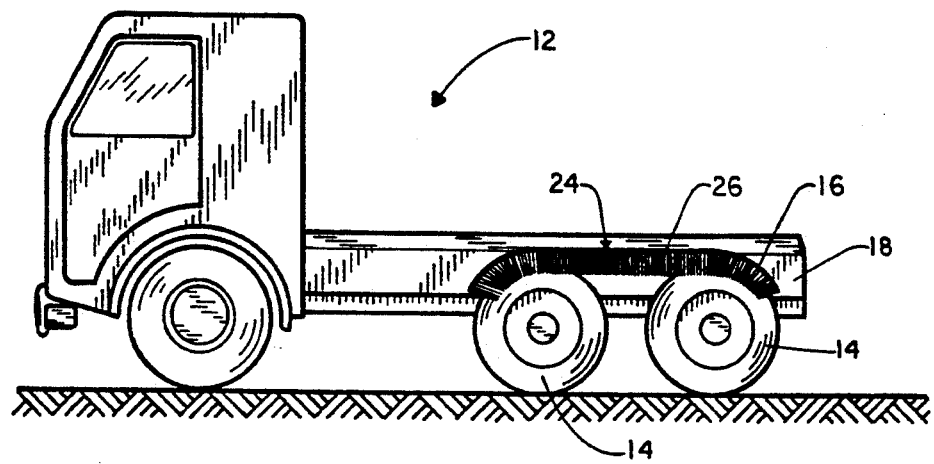
FIG. 1
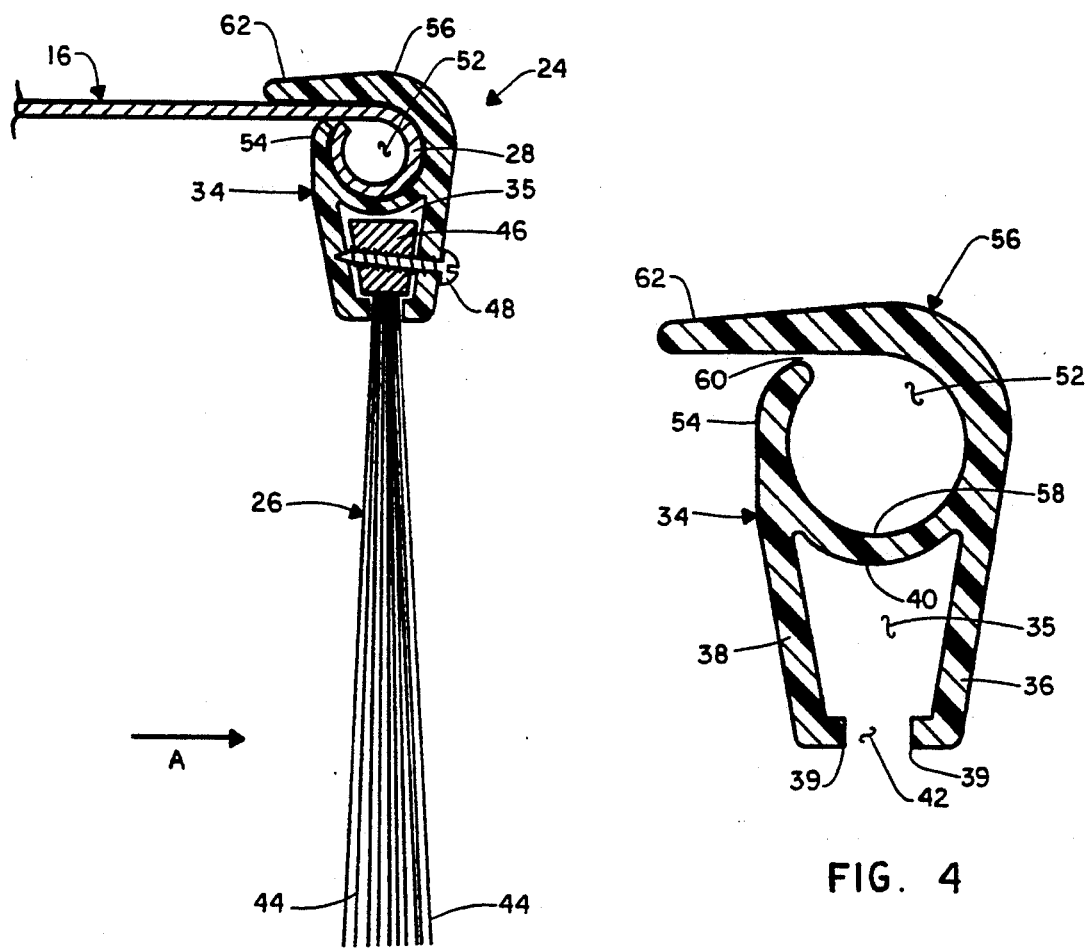
FIG. 3
FIG. 4

SPRAY SUPPRESSANT APPARATUS

BACKGROUND OF THE INVENTION

1. Field of the Invention

The present invention relates to a device which controls wet weather spray and splash generated by the tires of a vehicle. More particularly, it relates to a member mounted to a fender for supporting a spray suppressant brush.

2. Description of Related Art

As a vehicle, such as a large truck, travels on a wet road surface, its tires pick up fluid from the underlying roadway. The fluid is thrown from the tires in the form of a splash or spray. When the spray strikes a solid surface on the truck, such as a mud flap or fender it is atomized and deflected outwardly as a mist or fine spray. In addition to water from the roadway, the tires can also pick up small rocks, salt, slush and other debris.

The problem of spray and other debris emanating from moving vehicles has become more apparent in recent years because traveling speeds of vehicles are progressively increasing. The amount of splash and spray produced by the vehicle increases dramatically as the speed of the vehicle increases. The spray and debris are disbursed behind the vehicle and into adjacent traffic lanes making it dangerous or hazardous to follow behind such a vehicle or making it dangerous or impossible for that vehicle to be passed by another. It also presents hazards for oncoming traffic as they pass the vehicle.

It has been found that mounting a multi-filament brush adjacent to the tire can reduce the spray emanating from the vehicle. The atomized spray is trapped within the filaments and is collected into larger droplets which drop harmlessly to the roadway rather than spraying outwardly from the vehicle. Previously, these brushes have been mounted to a vehicle fender by a plurality of fasteners, such as screws.

An example of a multi-filament spray reducing device is seen in U.S. Pat. No. 3,899,192 issued Aug. 12, 1975 to Reddaway. Multi-filament sheets are mounted within the wheel well by attaching an edge of the sheets to a support member by screws.

Various other spray reducing devices have been developed which channel the air flow around the vehicle tires directing the atomized water and other debris so that it can be condensed and fall harmlessly to the roadway. Examples of such devices are seen in U.S. Pat. No. 4,325,563 issued Apr. 20, 1982 to Brandon et al., U.S. Pat. No. 4,706,981 issued Nov. 17, 1987 to Dorwart and U.S. Pat. No. 4,921,276 issued May 1, 1990 to Morin.

What is lacking in each of the known spray suppressant devices is an easy-to-install device for mounting a spray suppressant brush to a vehicle fender. In addition, the prior art devices do not provide adequate means to resist the outward force applied to the spray brush from the turbulent air exiting the wheel well.

SUMMARY OF THE INVENTION

The spray suppressant apparatus, according to the invention, overcomes the problems of the prior art by utilizing a dual channel mounting member for mounting the spray suppressant apparatus to a vehicle and for retaining a replaceable spray suppressant brush.

The invention comprises a spray suppressant apparatus adapted to be mounted to a vehicle fender or the like. The spray suppressant apparatus comprises a spray brush and a mounting member. The mounting member has a first channel with a first opening adapted to receive the spray brush and a second channel with a second opening adapted to be received on the fender.

In a further embodiment, the first channel is generally U-shaped and comprises a pair of opposed arms interconnected by a web. The terminal ends of the arms define an opening at a terminal end thereof.

In another embodiment, the second channel is generally C-shaped and comprises an inboard arm and an outboard arm interconnected by a web. The terminal ends of the arms define an opening.

In yet another embodiment, the outboard arm further comprises a lever arm wherein the lever arm resists outward flexing of the spray brush.

In a further embodiment, the outboard arm is thicker in cross section than the inner arm such that the outboard arm resists outward flexing of the spray brush.

In another embodiment, the mounting member is formed of a pliable material. In yet another embodiment, the opening of the first channel is oriented approximately 90° from the opening of the second channel.

In a further embodiment, at least one fastener extends through the mounting member into the spray brush to attach the spray brush in the first channel.

In another embodiment, the spray suppressant apparatus comprises a vehicle fender, a spray brush and a mounting member. The mounting member has a first channel with a first opening adapted to receive the spray brush and a second channel with a second opening adapted to be received on the fender.

In a further embodiment, the terminal edge of the inboard arm of the C-shaped channel abuts the lower surface of the fender.

In another embodiment, the outboard edge of the fender has a generally circular cross section which is generally, complementary in shape to the C-shaped channel of the mounting member.

In yet another embodiment, the spray brush has a base which is generally rectangular in cross section, complementary to the U-shaped channel.

In yet another embodiment, a spray suppressant mounting apparatus comprises a first channel and a second channel. The first channel has an opening with a pair of opposed arms interconnected by a web. The second channel has an opening and a first and second arm interconnected by a web wherein one of the first and second arms of the second channel has a lever arm mounted at the terminal end thereof.

BRIEF DESCRIPTION OF THE DRAWINGS

The invention will now be described with reference to the drawings wherein:

FIG. 1 is an elevational view of a vehicle with the spray suppressant apparatus according to the invention;

FIG. 3 is a sectional view of the vehicle fender and spray suppressant apparatus taken along lines 3—3 of FIG. 2; and FIG. 4 is an enlarged sectional view of the mounting member of the spray suppressant apparatus, according to the invention.

DESCRIPTION OF THE PREFERRED EMBODIMENT

Figure 2:
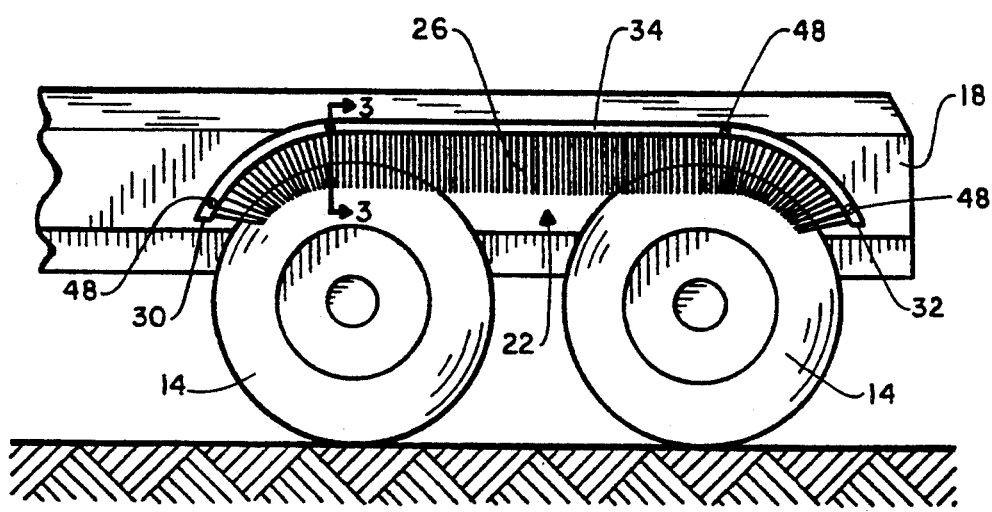
FIG. 2 is an elevational view of a vehicle fender with the spray suppressant apparatus mounted thereon.

Referring now to the drawings, and to FIG. 1 in particular, a vehicle 12 is seen with a plurality of ground engaging rear tires 14. A fender 16 is mounted to the vehicle frame 18 adjacent the tires 14 in a standard fashion. A mud flap (not shown) can be mounted at the terminal edge of the fender 16 to the rear of the tires 14. The fender typically has a curved leading portion, a horizontal portion and curved trailing portion. A spray suppressant apparatus 24 is selectively mounted to the fender 16. Preferably, the spray suppressant apparatus is mounted along the entire length of the fender including the curved leading and trailing ends. The spray suppressant apparatus which is mounted adjacent the rear wheels of vehicle 12 shown in FIG. 1 which represents a semi-tractor although it is understood that the spray suppressant apparatus according to the invention can be employed on any vehicle with ground engaging tires including semi-trailers, automobiles and trucks.

As seen in FIG. 2, the spray suppressant apparatus 24 comprises a spray brush 26 and a brush mounting member 34. Preferably, the spray brush 26 is mounted to an outboard edge of the fender 16 and extends the entire length of the outboard edge 28. The brush mounting member 34 is preferably made of a flexible, pliable material such that it easily follows the contour of the fender 16. Although the spray brush 26 of the preferred embodiment is mounted only along the outboard edge 28 of the fender 16, it is understood that the spray brush 26 can also be mounted along the leading edge 30, trailing edge 32 and an inside edge (not shown) of the fender 16.

FIG. 3 shows a sectional view along lines 3—3 of FIG. 2. In the preferred embodiment, the brush mounting member 34 is a dual channel member having a first channel 35 engaging the brush and a second channel 52 engaging the fender 16. FIG. 4 is an enlarged sectional view of the mounting member 34. The first channel 35 of the mounting member 34 is U-shaped having a pair of opposed arms, 36 and 38, a web 40 interconnecting the inboard ends of the opposed arms and a first opening 42 at the outboard ends of the opposed arms, 36 and 38. The outboard ends of the opposed arms, 36 and 38, have an inwardly directed flange, 39 and 41, respectively, formed thereon. The flanges, 39 and 41, serve to restrict the size of the opening 42.

As seen in FIG. 3, the spray brush 26 comprises a plurality of filaments 44 which are securely mounted in a base 46. The base 46 is slidably received in the U-shaped channel 35. Preferably, the cross section of the base 46 is generally rectangular and complementary to the U-shaped channel 35 and is wider than the first opening 42 of the opposed arms 36 and 38. The filaments 44 extend through the first opening 42.

The base 46 is securely mounted within the U-shaped channel by a plurality of fasteners, such as screws 48. Preferably, one screw 48 is installed at the leading and trailing edges of the mounting member 34. As shown in FIG. 2, additional screws 48 can be used along the length of the mounting member as needed.

The second channel 52 of the mounting member 3 is preferably C-shaped. The channel 52 comprises an inboard arm 54, an outboard arm 56 and a web 58 interconnecting the arms 54 and 56. The terminal end of the inboard arm 54 and the body of outboard arm 56 define an opening 60.

Preferably, the outboard edge 28 of the fender 16 is rolled to create a generally circular cross section. This rolled surface is complementary in shape to the C-shaped channel 52. The C-shaped channel 52 of the mounting member 34 is slidably received on the rolled outboard edge 28 of the fender 16 and retained thereon by a friction fit.

In the preferred embodiment, the inboard arm 54 of the C-shaped channel 52 abuts the underside of the fender 16. The outboard arm 56 of the C-shaped channel 52 has a lever flange 62 mounted at the terminal end thereof which extends along the surface of the fender 16. As seen in FIG. 3, the lever flange 62 extends beyond the terminal end of the inboard arm 54.

In operation, as the vehicle travels on a roadway, the tires 14 pick up water, slush, snow and other debris from the roadway. As water droplets are thrown against the mud flap (not shown) and the internal surface of the fender 16, they are atomized. The turbulent air flow surrounding the rotating tires 14 creates a spray which emanates outward from the tires 14. As the atomized spray encounters the filaments 44 of the spray brush 26, it condenses on the filaments 44 into larger water droplets which fall harmlessly to the roadway. Similarly, debris or slush which can be picked up by the tires 14 and thrown outwardly also encounter the filaments 44 of the spray brush 26 and are deflected back toward the road surface rather than being projected from the vehicle 12 into other lanes of traffic.

The fender 16, vehicle frame 18 and mud flap (not shown) tend to confine the turbulent air flow created by the tires on three sides. As a consequence, the air flow is forced outwardly in the direction of arrow A as seen in FIG. 3 tending to force the filaments 44 outwardly and disengage the C-shaped channel 52 from the outboard edge 28 of the fender 16. The mounting member 34 according to the invention is constructed to resist the outward force.

As seen in FIG. 3, the outboard arm 56 has a thickened body which provides additional strength and support for the mounting member 34 to resist the outward force. In addition, the lever flange 62 mounted at the terminal end of the outboard arm 56 acts as a lever arm to resist the outward force exerted on the spray brush 26 and mounting member 34. The combination of the lever flange 62 and the increased strength of the outboard arm 56 creates a mounting member 34 strong enough to overcome the lateral, outward force created by the turbulent air flow within the wheel well 22. In addition, the combination of the lever flange 62 and the thickened body of the outboard arm 56 help to clamp the base 46 of the brush 26 within the U-shaped channel 35.

The increased strength of the mounting member 34 surrounding the outboard edge 28 of the fender 16 is important to resist the outward force from the air flow. The other portions of the mounting member 34 do not require the same amount of strength and therefore can be thinner. In trucking, weight considerations are important and utilizing the thinnest material possible is important to reduce excess weight. The mounting member according to the invention keeps the thickness and therefore the weight of the mounting member 34 at a minimum and yet has sufficient strength to resist the outward force of the airflow from the wheel well 22.

In the preferred embodiment, the opening 60 of the C-shaped channel 52 is oriented approximately 90° from the opening 42 of the U-shaped channel 35. It is understood that the orientation of the channels can be varied. For example, the channels can be axially aligned such that the second channel 52 is oriented vertically and received on a downwardly extending rolled edge of the fender. In this embodiment, the flange of the thickened arm of the second channel 52 would extend above the terminal end of the inboard arm 54 and provide the lever force to resist the outward airflow from the wheel well 22.

While particular embodiments of the invention have been shown, it will be understood, of course, that the invention is not limited thereto since modifications can be made by those skilled in the art, particularly in light of the foregoing teachings. Reasonable variation and modification are possible within the foregoing disclosure of the invention without departing from the scope of the invention.

The embodiments of the invention in which an exclusive property or privilege is claimed are defined as follows:

1. A spray suppressant apparatus adapted to be mounted on an elongated rolled edge of a vehicle fender or the like comprising:
   a spray brush having a plurality of filaments and a base portion; and
   an integrally formed mounting member having a spray brush holder forming a first channel defined by a pair of opposed inboard and outboard arms, the opposed arms having upper ends interconnected by a web and a lower terminal ends which are spaced apart to define a first opening, the first channel adapted to slidably receive and retain the base portion of the spray brush with the filaments extending below the first opening, and a fender grip portion forming a second channel defined by opposed inboard and outboard arms extending upwardly from respective upper ends of inboard and outboard arms of the first channel, and a lever arm extending inwardly from a terminal upper end of the outward arm of the second channel and overlying a terminal upper end of the inboard arm of the second channel to form a second opening therebetween, wherein the inboard and outboard arms of the second channel, the web, and the leer arm form an interior configuration adapted to slidably receive and conform to the rolled edge of the fender with the fender extending through the second opening.

2. A spray suppressant apparatus according to claim 1 wherein the first channel is generally U-shaped.

3. A spray suppressant apparatus according to claim 1 wherein the outboard arm of the second channel is thicker in cross section than the inboard arm of the second channel such that the thicker outboard arm resists outward flexing of the outboard arm to enhance resistance to force tending to dislodge the mounting member from the finder due to outward flexing of the spray brush.

4. A spray suppressant apparatus according to claim 1 wherein the mounting member is formed from a pliable material.

5. A spray suppressant apparatus according to claim 1 wherein the first opening of the first channel is oriented approximately ninety degrees from the second opening of the second channel.

6. A spray suppressant apparatus according to claim 1 further comprising at least one fastener extending through the mounting member into the base portion of the spray brush for attaching the spray brush in the first channel.

7. A spray suppressant brush mounting apparatus adapted to be mounted into a vehicle fender comprising:
   an internally formed mounting member having a spray suppressant brush portion forming a first channel defined by a pair of opposed first and second arms, the first and second arms being interconnected at upper ends by a web and defining a first opening between lower ends for slidably receiving a base of a spray brush, and a fender grip portion forming a second channel defined by opposed third and fourth arms extending upwardly from the upper ends of the first and second arms respectively, the third and fourth arms being interconnected at lower ends by the web, the second channel being adapted to snugly receive and conform to the edge portion of a fender having a contoured cross section for mounting the spray suppressant mounting apparatus thereto, the third arm being longer in length than the fourth arm to form a lever arm which extends across the second channel to overlie an upper end of the fourth arm to form a second opening therebetween, the lever arm being adapted to extend along an outer surface of a fender when the fender grip portion is mounted to the fender edge portion, and the third arm also being thicker in cross section than the second arm to resist outward flexing of the third arm with respect to the fourth arm.

8. A spray suppressant apparatus according to claim 7 wherein the first channel is generally U-shaped in cross section.

9. A spray suppressant apparatus according to claim 7 wherein the mounting member is formed form a pliable material.

10. A spray suppressant apparatus according to claim 7 wherein the first open of the first channel is oriented approximately ninety degrees form the second opening of the second channel.

11. A spray suppressant apparatus according of claim 7 wherein the second channel is generally C-shaped in cross section.

* * * * *

UNITED STATES PATENT AND TRADEMARK OFFICE
CERTIFICATE OF CORRECTION

PATENT NO. : 5,269,547
DATED : December 14, 1993
INVENTOR(S) : STEVEN A. ANTEKEIER It is certified that error appears in the above-identified patent and that said Letters Patent is hereby corrected as shown below:

Claim 1, column 5, line 45, "leer" should read --lever--.

Claim 3, column 6, line 1, "finder" should read --fender--.

Claim 7, column 6, line 18, "internally" should read --integrally--.

Claim 9, column 6, line 48, "form" should read --from--.

Claim 10, column 6, line 52, "form" should read --from--.

Claim 11, column 6, line 54, "according of claim" should read --according to claim--

Signed and Sealed this

Sixteenth Day of August, 1994

*Attest:*

BRUCE LEHMAN

*Attesting Officer*     *Commissioner of Patents and Trademarks*